United States Patent [19]

Herrington

[11] Patent Number: 4,640,640
[45] Date of Patent: Feb. 3, 1987

[54] SUBSTANTIALLY FRICTIONLESS UNIVERSAL CONNECTING DEVICE

[75] Inventor: Fox J. Herrington, Holcomb, N.Y.

[73] Assignee: Mobil Oil Corporation, New York, N.Y.

[21] Appl. No.: 707,274

[22] Filed: Mar. 1, 1985

[51] Int. Cl.⁴ .................... F16D 3/00; F16C 11/06
[52] U.S. Cl. ........................................ 403/57; 403/74; 403/291; 464/147
[58] Field of Search .............. 403/57, 58, 74, 291; 308/2 A; 464/147

[56] References Cited

U.S. PATENT DOCUMENTS

| | | | |
|---|---|---|---|
| 2,906,522 | 9/1959 | Wagner | 308/2 A |
| 3,985,000 | 10/1976 | Hartz | 403/57 |
| 4,128,352 | 12/1978 | Newell | 403/57 |
| 4,300,362 | 11/1981 | Lande et al. | 464/147 |
| 4,382,709 | 5/1983 | Brown | 403/57 |
| 4,405,184 | 9/1983 | Bahiman | 308/2 A |
| 4,516,958 | 5/1985 | Phillips | 464/147 |

Primary Examiner—Cornelius J. Husar
Assistant Examiner—Peter M. Cuomo
Attorney, Agent, or Firm—Alexander J. McKillop; Michael G. Gilman; Charles J. Speciale

[57] ABSTRACT

A substantially frictionless connecting means providing universal swivel movement which can be used to mount an actuation means such as a hydraulic cylinder, including first and second flexible planar blades interconnected substantially perpendicular to each other so that movement imparted to either or both of the connected members bends the flexible blades.

8 Claims, 5 Drawing Figures

SUBSTANTIALLY FRICTIONLESS UNIVERSAL CONNECTING DEVICE

BACKGROUND OF THE INVENTION

The present invention relates to the art of moveable connections, and, in particular, to connections which provide universal movement between the connected members.

It has been known in the art of universal movement swivel joints between connected members to provide interlocking members which are free to move essentially perpendicularly to each other thereby permitting the connected members to move substantially in any lateral direction relative to each other. Normally such movement is provided by attaching the two connected members to interlocking connectors which rotate at substantially a 90° angle while bearing against each other.

The high degree of movement generally experienced in such joints wherein the surfaces continually bear against each other causes much wear due to friction. Consequently, it is important to provide sufficient lubrication to prevent or reduce degradation due to friction wear. Provision of lubrication to the total load-bearing surface is enhanced when there is a wide range of movement of interlocking members because the interlocking members themselves operate to spread the lubricant. However, there are also problems incurred in maintaining the appropriate amount of lubricant at the site of a joint having a wide range of movement due to difficulty in sealing the members.

In some cases, connections providing universal movement are required for mounting an actuated member or members which must swivel universally through very small angles, such as, for example, no more than about 7°. Such applications incur problems different from the wide movement connections. Specifically, effective lubrication is very difficult, if not impossible, since the limited range of movement does not effect spreading of the lubricant. Consequently, the interlocking members are abraded or fretted resulting in limited part life.

Each of the different types of universal joints, whether having large angle movement or small, suffers from problems caused by friction. Thus, it is a primary object of the present invention to reduce as much as possible problems incurred as a result of friction in universal swivel connections by eliminating the friction caused by surfaces bearing against each other.

SUMMARY OF THE INVENTION

The present invention is a substantially frictionless connecting means providing universal swivel movement between connected members which includes a first flexible planar blade member having a mounting end and a first connecting end. The mounting end of the first planar blade member is fixed to the first connected member with the first connecting end extended from the first connected member. The connecting device also includes a second flexible planar blade member having an attaching end and a second connecting end. The attaching end is fixed to a second connected member with the second connecting end extended from the second connected member. Finally, the connecting means includes an interconnecting means which connects the first connecting end of the first flexible blade member to the second connecting end of the second flexible blade member such that the plane of the blade members are oriented substantially perpendicular to each other so that motion imparted to the first and/or the second connected members bends the first and second flexible blade members.

In a preferred embodiment the connecting means is a swivel mounting for an actuating means having an actuating rod which follows an actuated object. For example, the actuating means can be either an air cylinder or a hydraulic cylinder. Other embodiments can include rotating drive shafts, shuttles, screw or wheel driven connecting rods, etc.

In one preferred embodiment, the first connected member is a fixed bracket from which the actuated object is made to operate, while the second con-nected member is one of either an air or hydraulic cylinders. Other embodiments can be connected analogously as is known in art.

One embodiment of the invention includes a block having connecting end fastening devices on the surfaces which are 90° from each other in order to provide the interconnecting means for the first and second blade members. Fastening devices in this embodiment usually include bolts, screws and the like and the first and second connecting ends are provided with holes sufficient to receive the shaft iof the bolts and/or screws whereby the connecting ends are fastened to the interconnecting block perpendicular to each other. This connection can be effected in a straight line from one connected member to another, or internally from the connected members as more fully set forth below.

While the flexible blade members can be made of a substance and at a thickness such that nearly any angle can be accommodated, in one preferred embodiment, the invention contemplates inclusion of blade members which are bent at angles of from about 0.01 to about 7°, with the most preferred embodiment having a non stressed angle of from about 0.05 to about 3.5°. The flexible blade members can be made of the materials such as heat treated steel just so long as the intended bend radius of the blade is such that the elongation at the surface of the blade is below the elastic limit of the blade material to avoid fatigue failure. Thus, a thinner blade will bend sharper within the elastic limit but is weaker in terms of ultimate load-bearing capabilities, while a thicker blade can carry a larger load but usually has a smaller bend angle which is within the elastic limit.

Finally, the present invention is also directed to a method of providing a substantially frictionless universal swivel connection between two members which includes connecting the first of the connected members to a first flexible planar blade member having a first interconnecting portion extending from the first connection, and connecting the second of the connected members to a second flexible planar blade member having a second interconnecting portion extending from the second connection. As in the apparatus, the method also includes interconnecting the first interconnecting portion to the second interconnecting portion such that a plane of the first and second blade members are oriented substantially 90° to each other so that motion imparted to either first and/or second connected members bends the first and/or second flexible blade members accordingly.

Another possible configuration may include providing a substantially frictionless joint between two connected members by use of a single blade connector, especially when the angle of movement is very small thus causing wear due primarily to fretting.

As a result of the present invention, a bearing surface such as a pin and bracket, especially those subjected to a very small movement, which typically experience fretting corrosion is improved by providing substantially frictionless universal swivel movement. Thus, universal connections, especially mountings for actuated parts, have increased durability because of no friction and require a lesser amount of energy to operate because the lack of friction and moving parts reduces the power necessary to effect movement.

For a better understanding of the present invention, together with other and further objects, reference is made to the following description, taken in conjunction with the accompanying drawings, in its scope will be pointed out in the appended claims.

BRIEF DESCRIPTION OF THE DRAWINGS

Preferred embodiments of the invention have been chosen for purposes of illustration and description and are shown in the accompanying drawings, wherein.

DETAILED DESCRIPTION OF THE INVENTION

Figure 1:
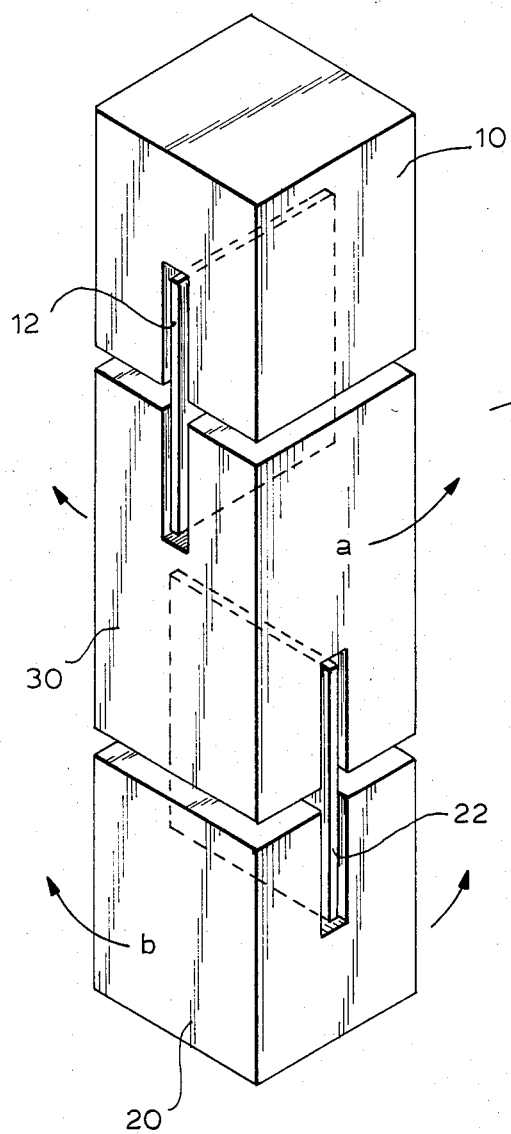
FIG. 1 is a schematic showing, in principle, the apparatus and method of the present invention.

Referring to FIG. 1 there is shown a schematic of an example apparatus which embodies the present invention. Specifically, there can be seen two connected members 10 and 20 respectively, which are joined together through a universal connection formed by flexible planar blades 12 and 22. The blades are interconnected by means of interconnecting block 30 such that the plane of each blade is substantially perpendicular to each other. Assuming for purposes of explanation that connected member 10 is fixed, it can be seen that movement back and forth perpendicular to blade 12 is accommodated by flexion along arrows a, while rotating movement perpendicular to blade 22 is accommodated by blade flexion along arrows b. If the device is intended for use in a single direction application, then connected member 10 and interconnecting block 30 represent the only connected members.

Figure 2:
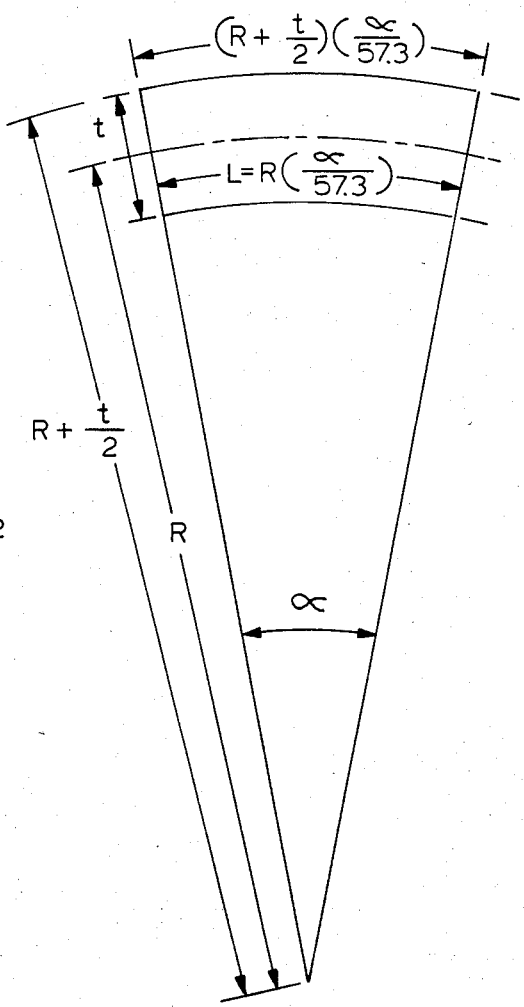
FIG. 2 is a schematic showing the dimension variable on which the present invention is based.

While the device of the present invention can be used in nearly any type of application regardless of the width of angle required, the principles upon which the present invention is based indicate that it is preferably used for swivel connections in which there is a very small angle of movement. For example, referring to FIG. 2, it can be seen that the strain limit for 100,000 psi of stress can be expressed in terms of the angle or established by the arc of the bend as well as the bend radius R taken between the midpoint of the blade thickness t and the center of the circle established by such arc. Specifically, the elongation, $\epsilon$, at the surface of the blade can be expressed in terms of the bend radius R on the midline L, as well as the thickness of the material, t, as in the expression $$\epsilon = \frac{(R + t/2)}{R} - 1$$

$$= \frac{R}{R} + \frac{t}{2R} - 1 = \frac{t}{2R}$$

since $L = \frac{R\alpha}{57.3}$ then $R = \frac{57.3\,L}{\alpha}$, therefore $\epsilon = \frac{t\alpha}{114.6\,L}$ Using 100,000 psi as the limit for yield stress of heat treated steel, since it has been listed as having a yield stress limit of from about 140,000 to about 160,000, one can see that the strain limit $$E = \frac{S}{\epsilon}.$$

Therefore $$\epsilon = \frac{S}{E} = \frac{100,000}{30 \times 10^6} = 3.33 \times 10^{-3} =$$

$$.00333 = \frac{t\alpha}{114.6\,L}; \text{ and since } \frac{t\alpha}{L} = .382 \text{ max,}$$

If
t=0.010, and
L=0.1,
then $\alpha$ max=3.82°

One skilled in the art guided by this type of calculation can, of course, determine the necessary material and thickness in any particular application.

Figure 3:
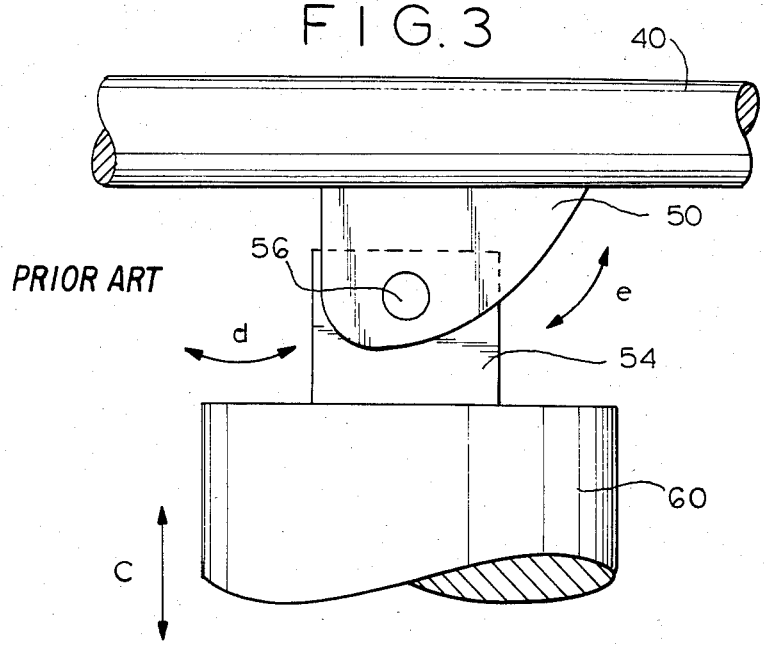
FIG. 3 depicts a specific application known in the art which the present invention is designed to replace.

The present invention has been found to be especially effective in providing a swivel mounting for a hydraulic or air cylinder, etc. which must swivel through a small angle, such as the application shown in FIG. 3. In particular, a brace 40 is shown having affixed thereto a fixed bracket 50 on which a cylinder 60 is mounted by means of rear pivot mounting 54. Any connecting pin or bolt type device 56 can be used to secure the rod end to the fixed bracket. It is intended in this embodiment that the cylinder rod of cylinder 60 be actuated for reciprocal movement generally along the direction indicated by arrow c to operate a repetitive stamping and/or cutting actuated object at the end of the rod so that swivel movement is effected along arrow d.

Furthermore, due to imperfections generally occurring in operating parts, such as results from machining or otherwise, as well as deviations incurred or increased through repeated operation, minor reciprocal moment is also realized in the direction of arrow e. Inasmuch as the swivel movement created in direction d and e is quite small, lubrication becomes very difficult since the lubricant is not effectively spread by gross relative surface movement, as is normally the case in rotating or pivoting joints. Consequently, abrading or fretting is created which ultimately necessitates part replacement.

Figure 4:
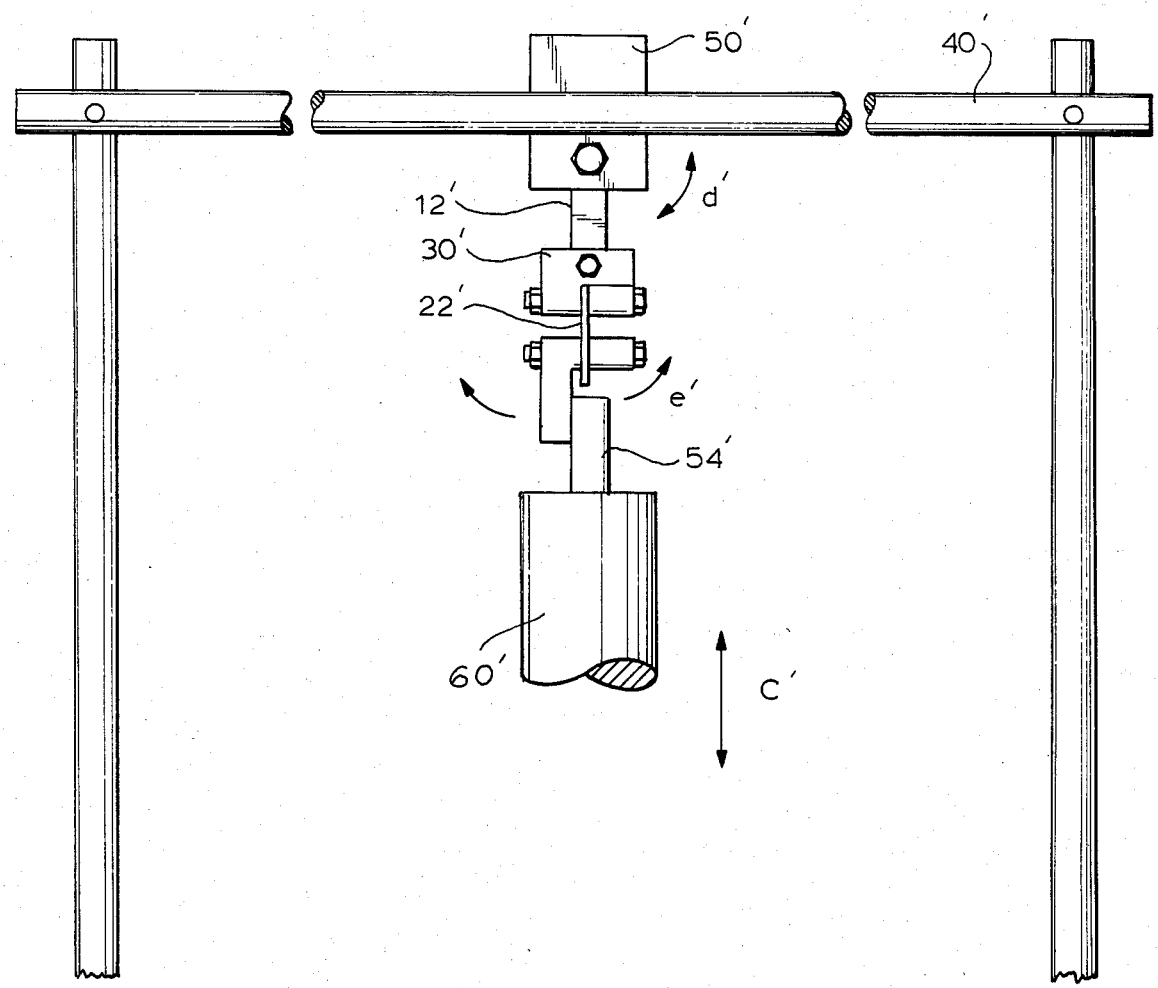
FIG. 4 shows a particular embodiment of the present invention which can be used to replace the device shown in FIG. 3.

Now, however, as a result of the present invention the connection shown in FIG. 3 can be eliminated and replaced by a virtually frictionless swivel connection providing universal movement between connected members. Referring to FIG. 4, a mounting rod 40' is shown having a mounting bracket 50' on which there is a swivel mounting for a second connected member, such as for a hydraulic or air cylinder. Specifically, the mounting bracket 50' is shown having attached thereto a first blade 12' which extends from the mounting bracket to an interconnecting block 30'. A second flexible blade 22' is mounted on interconnecting block 30 at 90° to blade 12' by an end which extends from a second connected member 20', which in turn is used to mount a cylinder by rear pivot mounting 54'. By virtue of this latter connection, cylinder 60' which is actuated to move in a reciprocal movement in the direction of arrow c' will be enabled to flow the actuated object and experience virtually frictionless swivel movement in the direction of arrow d' and e'. Accordingly, there will be little or no wearing of the connecting member and, consequently, little or no requirement for replacement of joint members.

The standard air cylinder mounting usually consists of a pin through a hole in the end of a rear pivot mounting and also through a bracket or clevis such as shown in the drawings. As a result of the present invention, the air cylinder can now swivel in universal direction so that the pieces can rotate relative to each other without wear and tear. Consequently, the blade system will not wear or seize. Any limitations realized by the present invention are due to the fact that the bend radius of a blade must be sufficiently large that the elongation at the surface is below the elastic limit of the blade material in order to avoid fatigue failure. Generally a thinner blade will bend sharper within the elastic limit but is weaker under loads.

Figure 5:
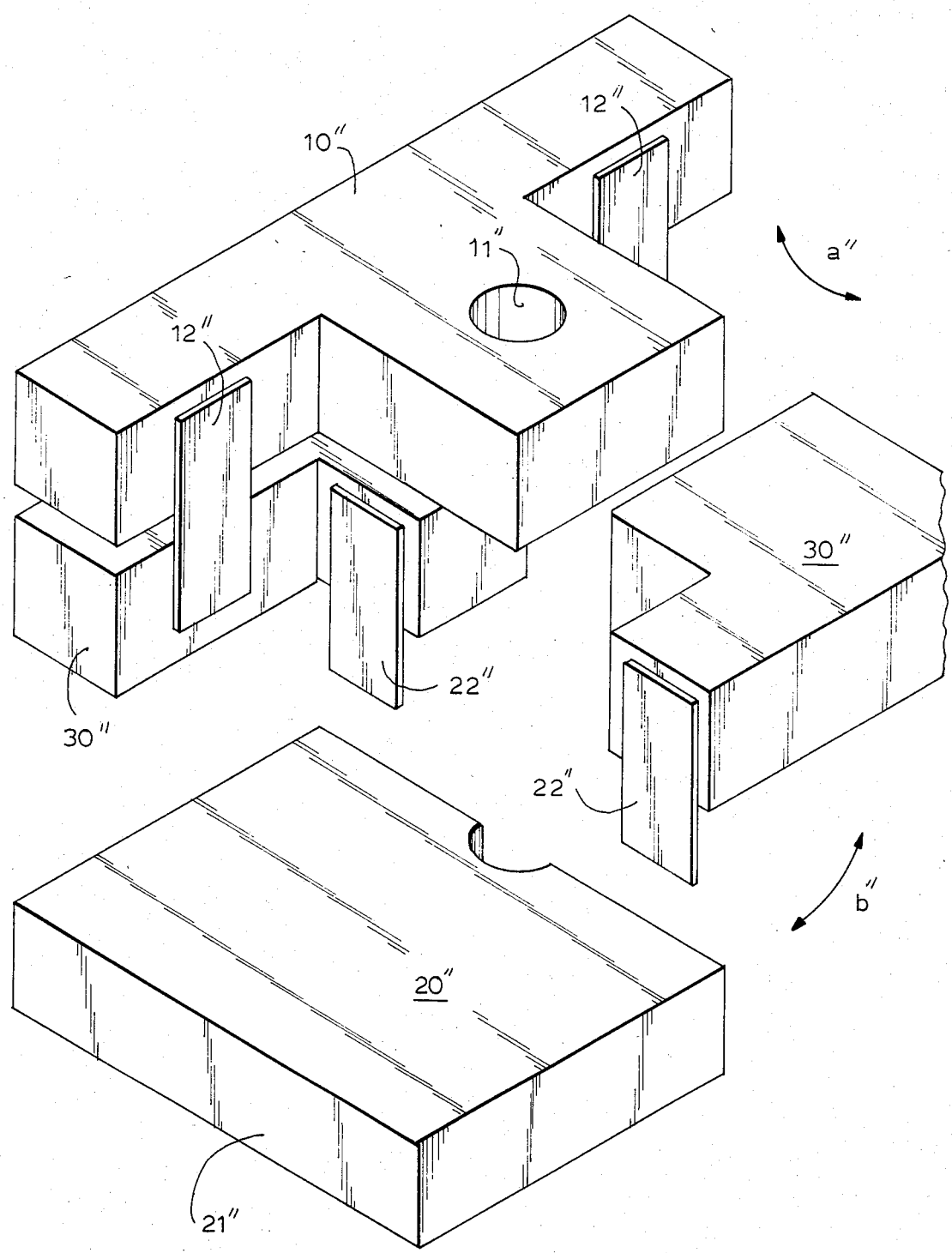
FIG. 5 shows another embodiment of a connection in accordance with the present invention.

In FIG. 5 a further embodiment is shown in an exploded isometric view in which the frictionless universal connection is implemented within the linear dimension of the necessary connecting parts. Specifically, the first connected member 10'' has planar blades 12'' which are extended from connection to interconnecting members 30'' whereby frictionless flexion is provided along arrow a''. Meanwhile connected member 20'' can be likewise attached to interconnecting member 30'' by means of planar blades 22'' to provide frictionless flexion along arrow b'' so that frictionless universal movement can be effected between member 10'' (which can advantageously be attached to a cylinder by means of attachment conduit 11'') and member 20'' (which can be mounted to a brace by means of mounting surface 21'').

Thus, while there have been described what are presently believed to be the preferred embodiments of the invention, those skilled in the art will realize that changes and modifications may be made thereto without departing from the spirit of the invention, and it is intended to claim all such changes and modifications as fall within the scope of the invention.

I claim:

1. Apparatus for universal swivel linear mounting of an actuated object comprising:
   a fixed mounting means for unencumbered support of linear actuation of said actuated object, said mounting means including a rod fixed at a certain height and a bracket mounted on said rod for connection to one end of a first elongated planar blade member;
   a combination extension/universal swivel connection which provides substantially frictionless universal swivel movement between said mounting means and said actuated object, said combination extension/universal swivel connection comprising;
   a first elongated flexible planar blade member having two ends, one of said ends connected to said bracket and the other of said ends extended from said bracket for interconnection;
   a second elongated flexible planar blade member having two ends, one of said ends connected to an actuated member and the other of said ends extended from said actuated member for interconnection, and
   an interconnecting means to which said other ends of said first and second flexible blade members are interconnected with the plane of each of said elongated planar blade members perpendicular to each other, said first and second elongated flexible planar blade members and said interconnecting means linearly arranged between said mounting means and said actuated member whereby said combination forms part of a connecting extension between said mounting means and said actuated member, and
   wherein said actuated member extends between said combination extension/universal swivel connection and said actuated object, said actuated member being connected to both said one end of said second elongated flexible planar blade member and said actuated object,
   whereby motion imparted by said actuated object is universally accommodated by bending of said first and second flexible blade members in the substantial absence of friction.

2. The apparatus as in claim 1 wherein said planar blade members are rectangular metal blades.

3. The apparatus as in claim 2 wherein said blades are steel and which have a maximum non-stress flexion angle of between about 0.01 to about 7° before the elastic limit of the blade material is attained.

4. The apparatus as in claim 3 wherein said steel blades have a thickness of about 0.01 inch and said maximum non-stress flexion angle is about 3.82°.

5. The apparatus of claim 1 wherein said connections are made with bolts inserted in bore holes in each said bracket, said interconnecting means, and said actuated means.

6. The apparatus as in claim 1 wherein said actuated object is a pneumatic apparatus.

7. The apparatus as in claim 1 wherein said actuated object is a hydraulic cylinder.

8. The apparatus as in claim 6 wherein said pneumatic apparatus is an air cylinder.

* * * * *